United States Patent
Nagai et al.

(10) Patent No.: US 10,222,525 B2
(45) Date of Patent: Mar. 5, 2019

(54) OPTICAL MEMBER AND IMAGE DISPLAY DEVICE INCLUDING OPTICAL MEMBER

(71) Applicant: FUJIFILM Corporation, Tokyo (JP)

(72) Inventors: Michio Nagai, Kanagawa (JP); Yoji Ito, Kanagawa (JP); Daisuke Kashiwagi, Kanagawa (JP); Akira Yamamoto, Kanagawa (JP); Nobuhiko Ichihara, Kanagawa (JP); Hideyuki Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/496,622

(22) Filed: Apr. 25, 2017

(65) Prior Publication Data

US 2017/0227692 A1 Aug. 10, 2017

Related U.S. Application Data

(63) Continuation of application No. PCT/JP2015/080471, filed on Oct. 29, 2015.

(30) Foreign Application Priority Data

Oct. 31, 2014 (JP) .................................. 2014-222880
Jan. 23, 2015 (JP) .................................. 2015-011318

(51) Int. Cl.
*G06F 3/03* (2006.01)
*G02B 5/26* (2006.01)
(Continued)

(52) U.S. Cl.
CPC ............. *G02B 5/26* (2013.01); *G06F 3/0321* (2013.01); *G06F 3/03545* (2013.01); *G06F 3/0421* (2013.01)

(58) Field of Classification Search
CPC ..... G02B 5/26; G06F 3/0321; G06F 3/03545; G06F 3/0421
See application file for complete search history.

(56) References Cited

U.S. PATENT DOCUMENTS

2008/0182041 A1* 7/2008 Sekine ................. G02B 5/3016 428/29
2008/0233360 A1 9/2008 Sekine et al.
2012/0219707 A1* 8/2012 Asanoi ..................... C08F 2/48 427/162

FOREIGN PATENT DOCUMENTS

JP 2008-165385 A 7/2008
JP 2008-180798 A 8/2008
(Continued)

OTHER PUBLICATIONS

Notification of Reasons for Refusal issued by the Japanese Patent Office (JPO) dated Jan. 9, 2018, in connection with Japanese Patent Application No. 2015-011318.
(Continued)

*Primary Examiner* — Nathanael R Briggs
(74) *Attorney, Agent, or Firm* — Edwards Neils, LLC; Jean C. Edwards, Esq.

(57) ABSTRACT

The optical member of the present invention includes: a substrate; and a dot that is in contact with a surface of the substrate, in which the dot has wavelength selective reflecting properties, the dot is formed of a liquid crystal material having a cholesteric structure, the cholesteric structure has a stripe pattern including bright portions and dark portions in a cross-sectional view of the dot when observed with a scanning electron microscope, the dot includes a portion having a height which continuously increases to a maximum height in a direction moving from an end portion of the dot to the center of the dot, in the portion, an angle between a normal line perpendicular to a line, which is firmed using a first dark portion from a surface of the dot, and the surface is in a range of 70° to 90°, and the liquid crystal material includes a surfactant.

20 Claims, 3 Drawing Sheets

(51) Int. Cl.
G02F 1/13 (2006.01)
G06F 3/042 (2006.01)
G06F 3/0354 (2013.01)

(56) References Cited

FOREIGN PATENT DOCUMENTS

| | | |
|---|---|---|
| JP | 2008-250541 A | 10/2008 |
| JP | 2011-133707 A | 7/2011 |
| JP | 5093034 B2 | 12/2012 |

OTHER PUBLICATIONS

International Preliminary Report on Patentability issued by WIPO dated May 4, 2017, in connection with international Patent Application No. PCT/JP2015/080471.
International Search Report issued in connection with International Patent Application No. PCT/JP2015/080471 dated Jan. 19, 2016.
International Preliminary Report on Patentability of Chapter II issued in connection with International Patent Application No. PCT/JP2015/080471 dated Nov. 29, 2016.
Office Action, issued by the State Intellectual Property Office of China dated Nov. 27, 2018, in connection with corresponding Chinese Patent Application No. 201580058888.7.

* cited by examiner

OPTICAL MEMBER AND IMAGE DISPLAY DEVICE INCLUDING OPTICAL MEMBER

CROSS-REFERENCE TO RELATED APPLICATIONS

This application is a continuation of PCT International Application No. PCT/JP2015/080471 filed on Oct. 29, 2015, which was published under PCT Article 21(2) in Japanese, and which claims priority under 35 U.S.C § 119 (a) to Japanese Patent Applications Nos. 2014-222880 and 2015-011318 filed on Oct. 31, 2014 and Jan. 23, 2015, respectively. The above applications are hereby expressly incorporated by reference, in their entirety, into the present application.

BACKGROUND OF THE INVENTION

1. Field of the Invention

The present invention relates to an optical member and an image display device including the optical member.

2. Description of the Related Art

A liquid crystal material having a cholesteric structure has wavelength selective reflecting properties and, due to these properties, has been used as materials for forming various optical members. For example, JP2008-165385A discloses a transparent sheet on which a pattern formed of a transparent ink is printed, in which the transparent ink includes a liquid crystal material having a cholesteric structure which selectively reflects infrared light. The transparent sheet is described as a sheet that data can be directly handwritten by being mounted on a display device and used in combination with an electronic pen, the electronic pen including: an infrared irradiating portion; and an infrared sensor that detects an infrared pattern reflected by the pattern.

SUMMARY OF THE INVENTION

In a liquid crystal material having a cholesteric structure, the highest wavelength selective reflecting properties are exhibited in a helical axis direction of the cholesteric structure. Therefore, in a case where a material with a helical axis direction aligned is used in a configuration where light is incident from a direction oblique to a helical axis and is detected or observed in the same direction, it is difficult to obtain high reflecting properties. JP2008-165385A describes that, by distributing a tilt angle between a helical axis direction and a normal line perpendicular to a surface of the transparent substrate at least in a range of 0° to 45°, an infrared reflection pattern-printed transparent sheet having a wide reading angle can be formed. However, the structure where the tilt angle is distributed as described above is adopted only to diffuse light, and the intensity of reflected light in respective directions cannot be sufficiently increased.

An object of the present invention is to provide an optical member including a liquid crystal material having a cholesteric structure, in which even in a case where light is incident from various directions including an oblique direction and is detected or observed in the same direction, the sensitivity of reflected light from the liquid crystal material is high. That is, an object of the present invention is to provide an optical member including a liquid crystal material having a cholesteric structure, in which the liquid crystal material exhibits high retroreflection properties in multiple directions. Another object of the present invention is to provide: the optical member which can be used as a sheet capable of being mounted on a display to input data; and an image display device including the optical member.

The present inventors performed an additional investigation on a reflection member including a liquid crystal material having a cholesteric structure, realized a structure in which a helical axis direction of a cholesteric structure is efficiently distributed, and obtained an optical member having high retroreflection properties in multiple directions, thereby completing the present invention.

That is, the present invention provides the following [1] to [12].

[1] An optical member comprising:
a substrate; and
a dot that is in contact with a surface of the substrate,
in which the dot has wavelength selective reflecting properties,
the dot is formed of a liquid crystal material having a cholesteric structure,
the cholesteric structure has a stripe pattern including bright portions and dark portions in a cross-sectional view of the dot when observed with a scanning electron microscope,
the dot includes a portion having a height which continuously increases to a maximum height in a direction moving from an end portion of the dot to the center of the dot,
in the portion, an angle between a normal line perpendicular to a line, which is formed using a first dark portion from a surface of the dot, and the surface is in a range of 70° to 90°, and
the liquid crystal material includes a surfactant.

[2] The optical member according to [1],
in which a plurality of the dots are provided in a pattern shape on the surface of the substrate.

[3] The optical member according to [1] or [2],
in which a diameter of the dot is 20 to 200 µm.

[4] The optical member according to [1] or [2],
in which a diameter of the dot is 30 to 120 µm.

[5] The optical member according to any one of [1] to [4],
in which a value obtained by dividing the maximum height by the diameter of the dot is 0.13 to 0.30.

[6] The optical member according to any one of [1] to [5],
in which in the end portion of the dot, an angle between the surface of the dot and the substrate is 27° to 62°.

[7] The optical member according to any one of [1] to [6],
in which the surfactant is a fluorine surfactant.

[8] The optical member according to any one of [1] to [7],
in which the liquid crystal material is a material obtained by curing a liquid crystal composition including a liquid crystal compound, a chiral agent, and the surfactant.

[9] The optical member according to any one of [1] to [8],
in which the dot has wavelength selective reflecting properties in which a center wavelength is present in an infrared range.

[10] The optical member according to [9],
in which the dot has wavelength selective reflecting properties in which a center wavelength is present at a wavelength of 800 to 950 nm.

[11] The optical member according to any one of [1] to [10] which is transparent in a visible range.

[12] An image display device comprising the optical member according to [11].

According to the present invention, a new optical member is provided. For example, the optical member according to the present invention is attached to a display device such that it can be used for directly handwriting data on the display device using a pen or the like to input data.

DESCRIPTION OF THE PREFERRED EMBODIMENTS

Figure 1A:
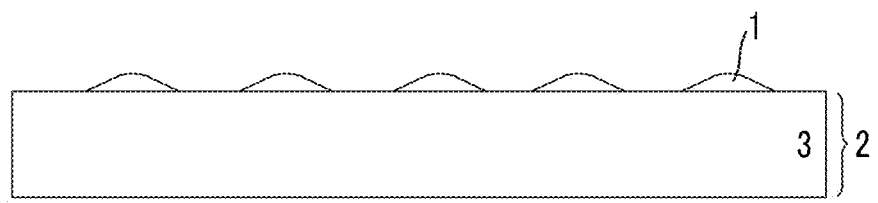
FIGS. 1A-1D are each a cross-sectional view schematically showing an example of an optical member according to the present invention.
Figure 1B:
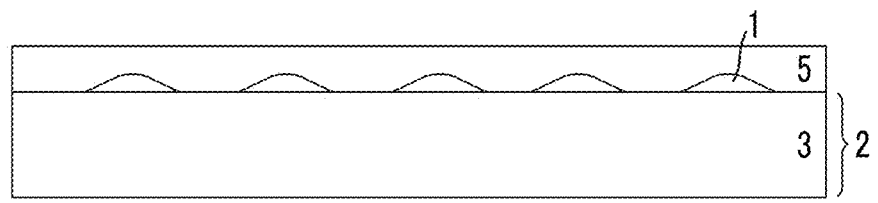
Figure 1C:
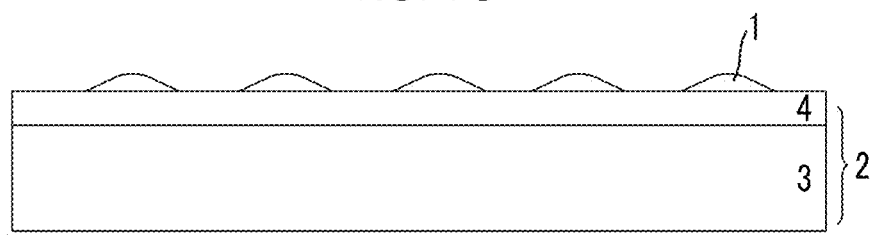
Figure 1D:
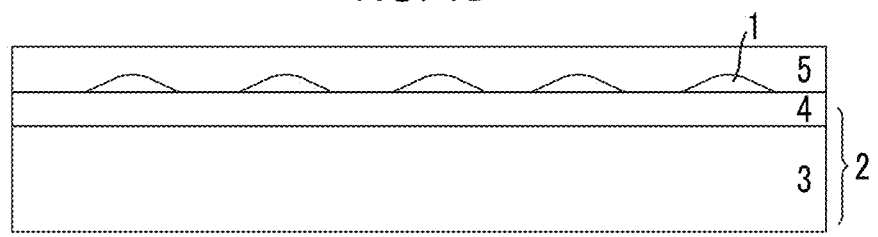

Hereinafter, the present invention will be described in detail.

In this specification, numerical ranges represented by "to" include numerical values before and after "to" as lower limit values and upper limit values.

In this specification, for example, unless specified otherwise, an angle such as "45°", "parallel", "perpendicular", or "orthogonal" represents that a difference from an exact angle is less than 5 degrees. The difference from an exact angle is preferably less than 4 degrees and more preferably less than 3 degrees.

In this specification, "(meth)acrylate" represents "either or both of acrylate and methacrylate".

In this specification, numerical values, numerical ranges, and qualitative expressions (for example, the expression "the same") implies numerical values, numerical ranges, and properties including errors which are generally allowable in the technical field. In particular, in this specification, the meaning of "all", "entire", or "entire surface" includes not only 100% but also a case where an error range is generally allowable in the technical field, for example, 99% or more, 95% or more, or 90% or more.

Visible light refers to light which can be observed by human eyes among electromagnetic waves and refers to light in a wavelength range of 380 nm to 780 nm Invisible light refers to light in a wavelength range of shorter than 380 nm or longer than 780 nm.

Among infrared light rays, near infrared light refers to an electromagnetic wave in a wavelength range of 780 nm to 2500 nm. Ultraviolet light refers to light in a wavelength range of 10 to 380 nm.

In this specification, retroreflection refers to reflection in which incident light is reflected in an incidence direction.

In this specification, "polar angle" refers to an angle with respect to a normal line perpendicular to a substrate.

In this specification, a surface of a dot refers to a surface or an interface of the dot opposite to a substrate, which is a surface in contact with the substrate. An end portion of a dot does not interfere with contact between a surface of a dot and the substrate.

"Transparent" described in this specification represents that the light transmittance is preferably 50% or higher, more preferably 70% or higher, and still more preferably 85% or higher. The light transmittance refers to a visible transmittance obtained using a method described in JIS A5759. That is, the visible transmittance is obtained by measuring a transmittance at a wavelength of 380 nm to 780 nm using a spectrophotometer and multiplying the measured transmittance by a weigthing factor to obtain a weighted average, the weigthing factor being obtained based on a spectral distribution of daylight D65 defined by The International Commission on Illumination (CIE) and a wavelength distribution and a wavelength interval of spectral luminous efficiency function for photopic vision defined by CIE.

In this specification, "haze" refers to a value measured using a haze meter NDH-2000 (manufactured by Nippon Denshoku Industries Co., Ltd.).

Theoretically, haze refers to a value expressed by the following expression.

(Diffuse Transmittance of Natural Light at 380 to 780 nm)/(Diffuse Transmittance of Natural Light at 380 to 780 nm+Parallel Transmittance of Natural Light)×100%

The diffuse transmittance refers to a value calculated by subtracting the parallel transmittance from a total transmittance which is obtained using a spectrophotometer and an integrating sphere unit. The parallel transmittance refers to a transmittance at 0° in a case where a value measured using an integrating sphere unit is used.

<Optical Member>

The optical member includes: a substrate; and a dot that is formed on a surface of the substrate, that is, a dot that is in contact with the surface of the substrate. The dot that is in contact with the surface of the substrate refers to a dot that is in direct contact with the surface of the substrate.

The shape of the optical member is not particularly limited and is, for example, a film shape, a sheet shape, or a plate shape. FIGS. 1A-1D are each a cross-sectional view schematically showing an example of the optical member according to the present invention. In an example shown in FIG. 1A, dots 1 are in contact with a surface of a substrate 2 including a support 3. In an example shown FIG. 1B, an overcoat layer 5 is provided on the dot-formed surface side of the substrate so as to cover the dots 1 In an example shown in FIG. 1C, the dots 1 are in contact with an underlayer-side surface of the substrate 2 including the support 3 and an underlayer 4. In an example shown in FIG. 1D, the overcoat layer 5 is provided on the dot-formed surface side of the substrate so as to cover the dots 1

The optical member according to the present invention may be transparent or not in the visible range depending on the application and is preferably transparent.

In the optical member according to the present invention, the upper limit of the concentration is preferably 5% or lower, more preferably 3% or lower, and still more preferably 2% or lower.

[Substrate]

The substrate included in the optical member according to the present invention functions as a substrate for forming the dot on the surface of the underlayer.

It is preferable that the reflectance of the substrate is low at a wavelength where the dot reflects light, and it is preferable that the substrate does not include a material which reflects light at a wavelength where the dot reflects light.

In addition, it is preferable that the substrate is transparent in the visible range. In addition, the substrate may be colored. However, it is preferable that the substrate is not colored or the area of the substrate colored is small. Further, the refractive index of the substrate is preferably about 1.2 to 2.0 and more preferably about 1.4 to 1.8. The above-described configurations are made in order to prevent deterioration in the visibility of an image displayed on a display in a case where the optical member is used for, for example, a front surface of the display.

The thickness of the substrate may be selected depending on the application without any particular limitation, and is preferably about 5 μm to 1000 μm, more preferably 10 μm to 250 μm, and still more preferably 15 μm to 150 μm.

The substrate may have a single-layer structure or a multi-layer structure. In a case where the substrate has a single-layer structure, examples thereof include glass, tri-acetyl cellulose (TAC), polyethylene terephthalate (PET), polycarbonates, polyvinyl chloride, acryl, and polyolefin. In a case where the substrate has a multi-layer structure, examples thereof a substrate including: one of the examples of the substrate having a single-layer structure that is provided as a support; and another layer that is provided on a surface of the support.

Examples of the other layer include an underlayer that is provided between the support and the dot. The underlayer is preferably a resin layer and more preferably a transparent resin layer. Examples of the underlayer include a layer for adjusting the surface shape during the formation of a dot, a layer for improving adhesion properties with a dot, and an alignment layer for adjusting the orientation of a polymerizable liquid crystal compound during the formation of a dot. It is preferable that the reflectance of the underlayer is low at a wavelength where the dot reflects light, and it is preferable that the underlayer does not include a material which reflects light at a wavelength where the dot reflects light. In addition, it is preferable that the underlayer is transparent. Further, the refractive index of the underlayer is preferably about 1.2 to 2.0 and more preferably about 1.4 to 1.8. It is preferable that the underlayer is a thermosetting resin or a photocurable resin obtained by curing a composition including a polymerizable compound which is directly applied to a surface of the support. Examples of the polymerizable compound include a non-liquid crystal compound such as a (meth)acrylate monomer or a urethane monomer.

The thickness of the underlayer is not particularly limited and is preferably 0.01 to 50 μm and more preferably 0.05 to 20 μm.

The surface of the substrate (the support or the underlayer) may be treated before the formation of the dot. For example, in order to form a dot having a desired shape or to form a desired dot pattern, a plasma treatment, a hydrophilic treatment, or a treatment for forming an uneven shape may be performed on the surface of the substrate.

In particular, in a case where glass is used as the substrate, it is preferable that a plasma treatment is performed on the glass surface before forming the dot on the glass surface. Conditions of the plasma treatment are not particularly limited. For example, the plasma treatment can be performed using an inert gas (for example, helium, argon, krypton, or xenon) or a reactive gas including at least O, N, F, or Cl ($O_2$, $CF_4$, $C_2F_4$, $N_2$, $CO_2$, $SF_6$, or $CHF_3$). In particular, it is preferable that the plasma treatment is performed using a reactive gas including fluorine. The plasma treatment may be performed under a plurality of conditions.

[Dot]

The optical member according to the present invention includes a dot that is in contact with the surface of the substrate. The dot may be formed on a single surface or both surfaces of the substrate and is preferably formed on a single surface thereof.

One dot or two or more dots may be formed on the surface of the substrate. Two or more dots may be provided to be adjacent to each other on the surface of the substrate such that the total surface area of the dots is 50% or more, 60% or more, or 70% or more with respect to the area of the surface of the substrate where the dots are formed. For example, in this case, the optical characteristics of the dots such as selective reflecting properties may match with the optical characteristics of substantially the entire area of the optical member, in particular, the entire area of the surface where the dots are formed. On the other hand, two or more dots may be provided to be distant from each other on the surface of the substrate such that the total surface area of the dots is less than 50%, 30% or less, or 10% or less with respect to the area of the surface of the substrate where the dots are formed. For example, in this case, the optical characteristics of the surface of the optical member where the dots are formed may be recognized as a contrast between the optical characteristics of the substrate and the optical characteristics of the dots.

A plurality of dots are formed in a pattern shape and may have a function of presenting information. For example, by forming the dots so as to provide position information on an optical member which is formed in a sheet shape, the optical member can be can be used as a sheet which can be mounted on a display and is capable of inputting data.

In a case where the dots are formed in a pattern shape, for example, a plurality of dots having a diameter of 20 to 200 μm are formed, 10 to 100 dots, preferably 15 to 50 dots, and more preferably 20 to 40 dots are provided on average in a square having a size of 2 mm×2 mm on the substrate surface.

In a case where a plurality of dots are provided on a surface of the substrate, the dots may have the same diameter and shape or different diameters and shapes and preferably has the same diameter and shape in order to obtain uniform reflected light from the respective dots. For example, it is preferable that the dots are formed under the same conditions for forming the dots having the same diameter and shape.

In this specification, the description of the dot is applicable to all the dots in the optical member according to the present invention. Further, it is allowable that the optical member according to the present invention including the above-described dots also includes a dot which deviates from the above description due to an error which is allowable in the technical field.

(Shape of Dot)

The dot may be circular when observed from a normal direction perpendicular to the substrate. The circular shape is not necessarily a perfect circle and may be a substantially circular shape. The center of the dot described herein refers to the center of the circle or the center of gravity. The shapes of the dots may be the same as or different from each other and are preferably the same as or at least similar to each other. In a case where a plurality of dots are provided on a surface of the substrate, it is preferable that the average shape of the dots is circular, and some dots may have a shape other than a circular shape.

The diameter of the dot film is preferably 20 μm to 200 μm and more preferably 30 μm to 120 μm. In a case where the dot is not circular, the dot is approximated to a circle to measure or calculate the diameter thereof.

The diameter of the dot can be obtained by measuring the length of a line, which ranges from an end portion (an edge or a boundary of the dot) to another end portion and passes through the center of the dot, in an image obtained using a microscope such as a laser microscope, a scanning electron microscope (SEM), or a transmission electron microscope (TEM). The number of dots and the distance between dots can be obtained from a microscopic image obtained using a laser microscope, a scanning electron microscope (SEM), or a transmission electron microscope (TEM)

The dot includes a portion having a height which continuously increases to a maximum height in a direction moving from an end portion of the dot to the center of the dot. That is, the dot includes an inclined portion, a curved portion, or the like whose height increases from an end portion of the dot to the center of the dot. In this specification, the above portion will also be referred to as the inclined portion or the curved portion. The inclined portion or the curved portion refers to a portion of a dot surface in a cross-sectional view, the portion being surrounded by a portion of the dot surface which ranges from a continuous increasing start point to a maximum height point, a straight line which connects the points to the substrate at the shortest distance, and the substrate.

"The height" of the dot described in this specification refers to "the shortest distance from a point of a surface of the dot to a surface of the substrate where the dot is formed". At this time, the surface of the dot may be an interface with another layer. In addition, in a case where the substrate has convex and concave portions, a surface of an end portion of the dot extending from the substrate is set as the surface where the dot is formed. The maximum height refers to a maximum value of the height which is, for example, the shortest distance from the peak of the dot to the surface of the substrate where the dot is formed. The height of the dot can be obtained from a cross-sectional view of the dot which is obtained by focal position scanning using a laser microscope or obtained using a microscope such as a SEM or a TEM.

The inclined portion or the curved portion may be present at end portions in some or all the directions when seen from the center of the dot. For example, in a case where the dot is circular, end portions correspond to the circumference, and the inclined portion or the curved portion may be present at end portions in some directions of the circumference (for example, portions corresponding to a length of 30% or more, 50% or more, or 70% or more and 90% or less of the circumference), or may be present at end portions in all the directions of the circumference (90% or more, 95% or more, or 99% or more of the circumference). It is preferable that the end portions of the dot may be present in all the directions of the circumference. That is, it is preferable that changes in height from the center of the dot to the circumference are the same in all the directions of the circumference. In addition, it is preferable that optical characteristics such as retroreflection properties and properties described regarding the cross-sectional view are the same in all the directions moving from the center to the circumference.

The inclined portion or the curved portion may be at a predetermined distance from an end portion of the dot (an edge or a boundary of the circumference) so as not to reach the center of the dot, or may reach the center of the dot from an end portion of the dot. In addition, the inclined portion or the curved portion may be at a predetermined distance from a portion, which is at a predetermined distance from an edge (boundary) of the circumference of the dot, so as not to reach the center of the dot, or may reach the center of the dot from a portion which is at a predetermined distance from an end portion of the circumference of the dot.

Examples of a shape of a structure including the inclined portion or the curved portion includes a hemispherical shape in which the substrate side is planar, a shape (spherical segment shape) in which the top of the hemispherical shape is cut and smoothened to be substantially parallel to the substrate, a conical shape having a bottom on the substrate side, a shape (truncated conical shape) in which the top of the conical shape is cut and smoothened to be substantially parallel to the substrate, and a shape which can be approximated to one of the above shapes. Among these shapes, a hemispherical shape in which the substrate side is planar, a shape in which the top of the hemispherical shape is cut and smoothened to be substantially parallel to the substrate, a shape in which the top of a conical shape having a bottom on the substrate side is cut and smoothened to be substantially parallel to the substrate, or a shape which can be approximated to one of the above shapes is preferable. The hemispherical shape represents not only a hemispherical shape in which a surface including the center of a sphere is planar but also any one of spherical segment shapes obtained by cutting a sphere into two segments at an arbitrary position (preferably a spherical segment shape not including the center of the sphere).

A point of the dot surface for obtaining the maximum height of the dot may be present at the peak of a hemispherical shape or a conical shape or may be present on a surface which is cut and smoothened to be substantially parallel to the substrate. It is preferable that the maximum height of the dot is obtained at all the points of the smooth surface. It is also preferable that the maximum height is obtained at the center of the dot.

It is preferable that a value (maximum height/diameter) obtained by dividing the maximum height by the diameter of the dot is 0.13 to 0.30. It is preferable that the above-described condition is satisfied particularly in a shape in which the height of the dot continuously increases to the maximum height from an end portion of the dot and in which the maximum height is obtained at the center of the dot, for example, a hemispherical shape in which the substrate side is planar, a shape in which the top of the hemispherical shape is cut and flattened to be substantially parallel to the substrate, or a shape in which the top of a conical shape having a bottom on the substrate side is cut and flattened to be substantially parallel to the substrate. The ratio maximum height/diameter is more preferably 0.16 to 0.28.

In addition, an angle (for example, an average value) between a surface of the dot and the substrate (surface of the substrate where the dot is formed) is preferably 27° to 62° and more preferably 29° to 60°. By setting the angle in the above-described range, the dot can be made to exhibit high retroreflection properties at a light incidence angle which is suitable for the applications of the optical member described below.

The angle can be obtained from a cross-sectional view of the dot which is obtained by focal position scanning using a laser microscope or obtained using a microscope such as a SEM or a TEM. In this specification, in a SEM image of a cross-sectional view of a surface of the dot perpendicular to the substrate including to the center of the dot, the angle of a contact portion between the substrate and the dot surface is measured.

(Optical Characteristics of Dot)

The dot has wavelength selective reflecting properties. Light where the dot exhibits selective reflecting properties is not particularly limited. For example, any one of infrared light, visible light, and ultraviolet light may be used. For example, in a case where the optical member is attached to a display device and is used for directly handwriting data on the display device to input data, the wavelength of light to which the dot exhibits selective reflecting properties is preferably a wavelength in the invisible range, more preferably a wavelength in the infrared range, and still more preferably a wavelength in the near infrared range in order not to adversely affect a display image. For example, it is preferable that a spectrum of reflection from the dot shows a reflection wavelength range in which a center wavelength is present in a wavelength range of 750 to 2000 nm and preferably 800 to 1500 nm. It is also preferable that the reflection wavelength is selected based on a wavelength of light emitted from a light source which is used in combination or a wavelength of light which is detected by a image pickup element (sensor).

The dot is formed of a liquid crystal material having a cholesteric structure The wavelength of light where the dot exhibits selective reflecting properties can be adjusted by adjusting a helical pitch in the cholesteric structure of the liquid crystal material which forms the dot as described above. In addition, regarding the liquid crystal material for forming the dot in the optical member according to the present invention, a helical axis direction of the cholesteric structure is controlled as described below. Therefore, retroreflection properties to light incident from various directions are high.

It is preferable that the dot is transparent in the visible range. In addition, the dot may be colored. However, it is preferable that the dot is not colored or the area of the dot colored is small. The above-described configurations are made in order to prevent deterioration in the visibility of an image displayed on a display in a case where the optical member is used for, for example, a front surface of the display.

(Cholesteric Structure)

It is known that the cholesteric structure exhibits selective reflecting properties at a specific wavelength. A center wavelength of the selective reflection depends on a pitch P (=helical cycle) of a helical structure in the cholesteric structure and complies with an average refractive index n of a cholesteric liquid crystal and a relationship of $\lambda=n\times P$. Therefore, the selective reflection wavelength can be adjusted by adjusting the pitch of the helical structure. The pitch of the cholesteric structure depends on the kind of a chiral agent which is used in combination of a polymerizable liquid crystal compound during the formation of the dot, or the concentration of the chiral agent added. Therefore, a desired pitch can be obtained by adjusting the kind and concentration of the chiral agent. The details of the adjustment of the pitch can be found in "Fuji Film Research&Development" No. 50 (2005), pp. 60 to 63. As a method of measuring a helical sense or pitch, a method described in "Introduction to Experimental Liquid Crystal Chemistry", (the Japanese Liquid Crystal Society, 2007, Sigma Publishing Co., Ltd.), p. 46, and "Liquid Crystal Handbook" (the Editing Committee of Liquid Crystal Handbook, Maruzen Publishing Co., Ltd.), p. 196 can be used. The reflection peak wavelength is similar to the center wavelength of the selective reflection and changes in the same way as that of the center wavelength of the selective reflection. Therefore, the reflection peak wavelength can be adjusted by adjusting the pitch of the helical structure.

The cholesteric structure has a stripe pattern including bright portions and dark portions in a cross-sectional view of the dot when observed with a scanning electron microscope (SEM). Two cycles of the bright portion and the dark portion (two bright portions and two dark portions) correspond to one helical pitch. Based on the above fact, the pitch can be measured from the SEM cross-sectional view. A normal line perpendicular to each line of the stripe pattern is a helical axis direction.

Reflected light of the cholesteric structure is circularly polarized light. That is, reflected light of the dot in the optical member according to the present invention is circularly polarized light. The application of the optical member according to the present invention can be selected in consideration of the circularly polarized light selective reflecting properties. Whether or not the reflected light of the cholesteric structure is right circularly polarized light or left circularly polarized light is determined depending on a helical twisting direction. Regarding the selective reflection by the cholesteric liquid crystals, in a case where the helical twisting direction of the cholesteric liquid crystals is right, right circularly polarized light is reflected, and in a case where the helical twisting direction of the cholesteric liquid crystals is left, left circularly polarized light is reflected.

In addition, a full width at half maximum $\Delta\lambda$ (nm) of a selective reflection bandwidth (circularly polarized light reflection bandwidth) depends on a birefringence $\Delta n$ of the liquid crystal compound and the pitch P and complies with a relationship of $\Delta\lambda=\Delta n\times P$. Therefore, the selective reflection bandwidth can be controlled by adjusting $\Delta n$. $\Delta n$ can be adjusted by adjusting the kind of the polymerizable liquid crystal compound and a mixing ratio thereof, or by controlling a temperature during oriented immobilization. The full width at half maximum of the reflection wavelength range is adjusted depending on the application of the optical member according to the present invention and is, for example, 50 to 500 nm and preferably 100 to 300 nm.

(Cholesteric Structure in Dot)

In a case where the inclined portion or the curved portion in the dot is observed in a cross-sectional view using a scanning electron microscope (SEM), an angle between a normal line perpendicular to a line, which is formed using a first dark portion from a surface of the dot, and the surface is in a range of 70° to 90°. At this time, regarding all the points of the inclined portion or the curved portion, it is preferable that an angle between a normal direction perpendicular to a line, which is formed using a first dark portion from a surface of the dot, and the surface may be in a range of 70° to 90°. That is, the angle only has to satisfy the above-described range at some points of the inclined portion or the curved portion. For example, the angle only has to satisfy the above-described range not intermittently but continuously at some points of the inclined portion or the curved portion. In a case where the surface in the cross-sectional view is curved, an angle between the normal line and the curved surface refers to an angle between the normal line and a tangent line from the surface. In addition, the angle between the normal line and the surface is expressed by an acute angle and is in a range of 70° to 110° when expressed by an angle of 0° to 180°. In the cross-sectional view, it is preferable that an angle between a normal line perpendicular to each of lines, which are formed using first and second dark portions from a surface of the dot, and the surface is in a range of 70° to 90°, it is more preferable that an angle between a normal line perpendicular to each of lines, which are formed using first to third or fourth dark portions from a surface of the dot, and the surface is in a range of 70° to 90°, and it is still more preferable that an angle between a normal line perpendicular to each of lines, which are formed using first to fifth to twelfth or more dark portions from a surface of the dot, and the surface is in a range of 70° to 90°.

The angle is preferably in a range of 80° to 90° and more preferably in a range of 85° to 90°.

The cross-sectional view obtained using the SEM shows that an helical axis of the cholesteric structure forms an angle of 70° to 90° with a surface of the dot of the inclined portion or the curved portion. Due to the above-described structure, light incident on the dot in a direction with an angle from a normal direction perpendicular to the substrate can be made to be incident at an angle, which is substantially parallel to the helical axis direction of the cholesteric structure, at the inclined portion or the curved portion. Therefore, the dot can exhibit high retroreflection properties with respect to light incident from various directions with an angle from the normal direction perpendicular to the substrate. For example, depending on the shape of the dot, the dot can exhibit high retroreflection properties with respect to light incident from a direction with a polar angle of 60° to 0°. It is more preferable that the dot can exhibit high retroreflection properties with respect to light incident from a direction with a polar angle of 45° to 0°.

It is preferable that, by making an helical axis of the cholesteric structure to form an angle of 70° to 90° with a surface of the dot of the inclined portion or the curved portion, an angle between a normal direction perpendicular to a line, which is formed using a first dark portion from the surface, and a normal direction perpendicular to the substrate continuously decreases along with a continuous increase in the height.

The cross-sectional view is a cross-sectional view of a surface in an arbitrary direction including a portion having a height which continuously increases to a maximum height in a direction moving from an end portion of the dot to the center of the dot. Typically, the cross-sectional view may be a cross-sectional view of an arbitrary surface which includes the center of the dot and is perpendicular to the substrate.

(Method of Forming Cholesteric Structure)

The cholesteric structure can be obtained by immobilizing a cholesteric liquid crystal phase. The structure in which a cholesteric liquid crystal phase is immobilized may be a structure in which the orientation of the liquid crystal compound as a cholesteric liquid crystal phase is immobilized. Typically, the structure in which a cholesteric liquid crystal phase is immobilized may be a structure which is obtained by making the polymerizable liquid crystal compound to be in a state where a cholesteric liquid crystal phase is oriented, polymerizing and curing the polymerizable liquid crystal compound with ultraviolet irradiation, heating, or the like to form a layer having no fluidity, and concurrently changing the state of the polymerizable liquid crystal compound into a state where the oriented state is not changed by an external field or an external force. The structure in which a cholesteric liquid crystal phase is immobilized is not particularly limited as long as the optical characteristics of the cholesteric liquid crystal phase are maintained, and the liquid crystal compound does not necessarily exhibit liquid crystallinity. For example, the molecular weight of the polymerizable liquid crystal compound may be increased by a curing reaction such that the liquid crystallinity thereof is lost.

Examples of a material used for forming the cholesteric structure include a liquid crystal composition including a liquid crystal compound. It is preferable that the liquid crystal compound is a polymerizable liquid crystal compound.

The liquid crystal composition including a polymerizable liquid crystal compound further includes a surfactant. The liquid crystal composition may further include a chiral agent and a polymerization initiator.

—Polymerizable Liquid Crystal Compound—

The polymerizable liquid crystal compound may be a rod-shaped liquid crystal compound or a disk-shaped liquid crystal compound and is preferably a rod-shaped liquid crystal compound.

Examples of the rod-shaped polymerizable liquid crystal compound for forming a cholesteric liquid crystal layer include a rod-shaped nematic liquid crystal compound. As the rod-shaped nematic liquid crystal compound, an azomethine compound, an azoxy compound, a cyanophenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3. Examples of the polymerizable liquid crystal compound include compounds described in Makromol. Chem. (1989), Vol. 190, p. 2255, Advanced Materials (1993), Vol. 5, p. 107, U.S. Pat. No. 4,683,327A, U.S. Pat. No. 5,622,648A, U.S. Pat. No. 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), JP2001-328973A, JP2014-198815A, and JP2014-198814A. Two or more polymerizable liquid crystal compounds may be used in combination. In a case where two or more polymerizable liquid crystal compounds are used in combination, the orientation temperature can be decreased.

Specific examples of the polymerizable liquid crystal compound include a compound represented by any one of the following formulae (1) to (11).

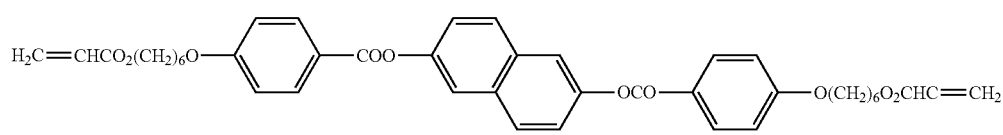

(1)

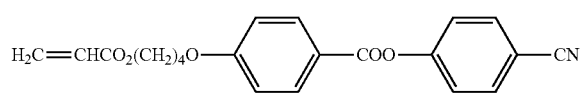

(2)

-continued

(3)

(4)

(5)

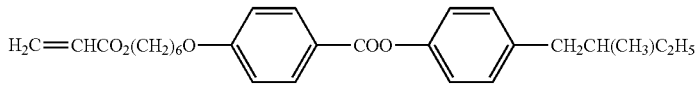
(6)

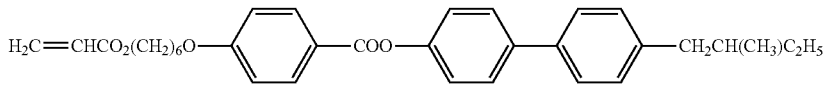
(7)

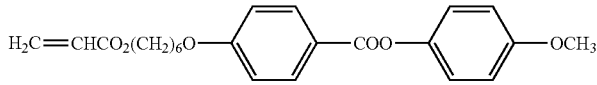
(8)

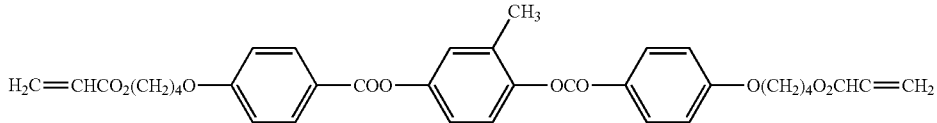
(9)

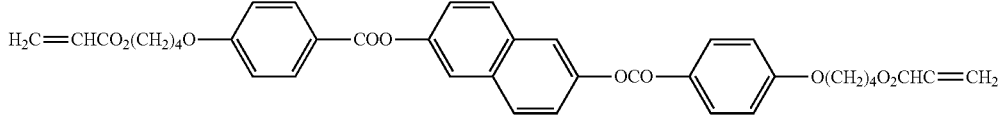
(10)

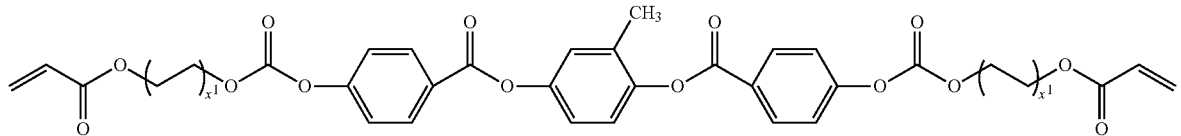
(11)

[In Compound (11), $X^1$ represents 2 to 5 (integer).]

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

In addition, the addition amount of the polymerizable liquid crystal compound in the liquid crystal composition is preferably 75 to 99.9 mass %, more preferably 80 to 99 mass %, and still more preferably 85 to 90 mass % with respect to the solid content mass (mass excluding a solvent) of the liquid crystal composition.

——Surfactant——

The present inventors found that, by adding the surfactant to the liquid crystal composition during the formation of a dot, the polymerizable liquid crystal compound is oriented to be parallel to an air interface side, and the helical axis direction of the dot is controlled as described above. In general, for the formation of a dot, it is necessary that the surface tension is not decreased to maintain a liquid drop shape during printing. Therefore, it is surprising that a dot can be formed even after the addition of the surfactant and that the dot exhibits high retroreflection properties in multiple directions. Examples described below shows that, in the optical member according to the present invention in which the surfactant was used, an angle between a dot surface and the substrate at a dot end portion was 27° to 62°. That is, it can be seen that, in the optical member according to the present invention, at dot shape can be obtained in which high retroreflection properties at an incidence angle of light required for use in an input medium, which is used in combination with input means such as an electronic pen, are exhibited. It is preferable that the surfactant is a compound which can function as an orientation controller contributing to the stable or rapid formation of a cholesteric structure with planar orientation. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and "0082" to "0085" of JP2002-129162A, and fluorine (meth)acrylate described in paragraphs "0018" to "0043" of JP2007-272185A.

As the surfactant, one kind may be used alone, or two or more kinds may be used in combination.

Examples of the fluorine surfactant include a compound represented by the following Formula (I) described in paragraphs "0082" to "0090" of JP2014-119605A.

$(Hb^{11}-Sp^{11}-L^{11}-Sp^{12}-L^{12})_{m11}-A^{11}-L^{13}-T^{11}-L^{14}-A^{12}-(L^{15}-Sp^{13}-L^{16}-Sp^{14}-Hb^{11})_{n11}$  Formula (I)

In Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (in Formula (I), R represents a hydrogen atom or an alkyl group having 1 to 6 carbon atoms). —NRCO— or —CONR— has an effect of reducing solubility and is likely to increase haze during the preparation of the dot. From this viewpoint, —O—, —S—, —CO—, —COO—, —OCO—, —COS— or —SCO— is more preferable. From the viewpoint of the stability of the compound, —O—, —CO—, —COO—, or —OCO— is more preferable. An alkyl group represented by R may be linear or branched. An alkyl group having 1 to 3 carbon atoms is more preferable, and examples thereof include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, more preferably a single bond or an alkylene group having 1 to 7 carbon atoms, and still more preferably a single bond or an alkylene group having 1 to 4 carbon atoms. However, a hydrogen atom in the alkylene group may be substituted with a fluorine atom. The alkylene group may have a branch or not, and a linear alkylene group having no branch is preferable. From the viewpoint of synthesis, it is preferable that $Sp^{11}$ and $Sp^{14}$ are the same and $Sp^{12}$ and $Sp^{13}$ are the same.

$A^{11}$ and $A^{12}$ represent a monovalent to tetravalent aromatic hydrocarbon group. The number of carbon atoms in the aromatic hydrocarbon group is preferably 6 to 22, more preferably 6 to 14, still more preferably 6 to 10, and still more preferably 6. The aromatic hydrocarbon group represented by $A^{11}$ or $A^{12}$ may have a substituent. Examples of the substituent include an alkyl group having 1 to 8 carbon atoms, an alkoxy group, a halogen atom, a cyano group, and an ester group. The description and preferable ranges of the groups can be found in the corresponding description of T described below. Examples of a substituent with which the aromatic hydrocarbon group represented by $A^{11}$ or $A^{12}$ is substituted include a methyl group, an ethyl group, a methoxy group, an ethoxy group, a bromine atom, a chlorine atom, and a cyano group. A molecule including a large amount of a perfluoroalkyl portion can cause liquid crystal to be oriented even in a small addition amount, which leads to reduction in haze. Therefore, in order for the molecule to include many perfluoroalkyl groups, it is preferable that $A^{11}$ and $A^{12}$ are tetravalent. From the viewpoint of synthesis, it is preferable that $A^{11}$ and $A^{12}$ are the same.

$T^{11}$ represents a divalent group or a divalent aromatic heterocyclic group preferably represented by any one of the following formulae (X in $T^{11}$ represents an alkyl group having 1 to 8 carbon atoms, an alkoxy group, a halogen atom, a cyano group, or an ester group, and Ya, Yb, Yc, and Yd each independently represent a hydrogen atom or an alkyl group having 1 to 4 carbon atoms),

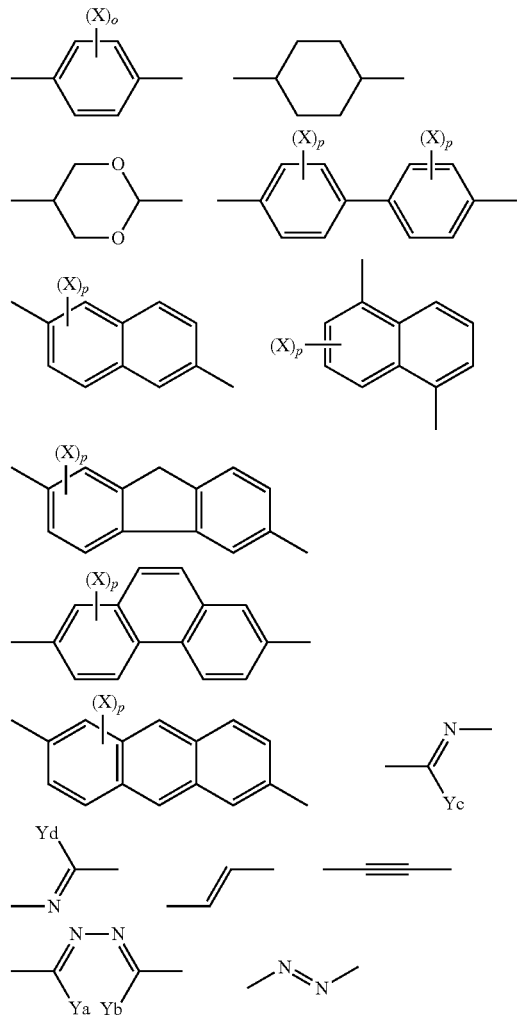

more preferably represented by any one of the following formulae,

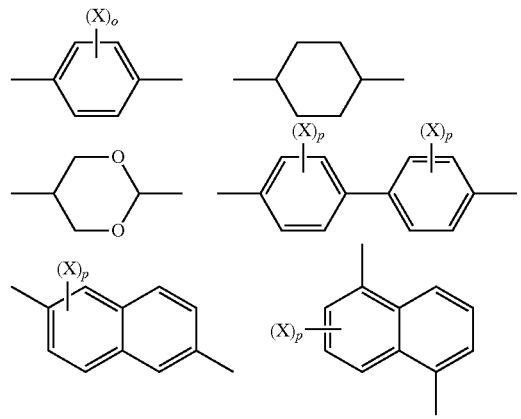

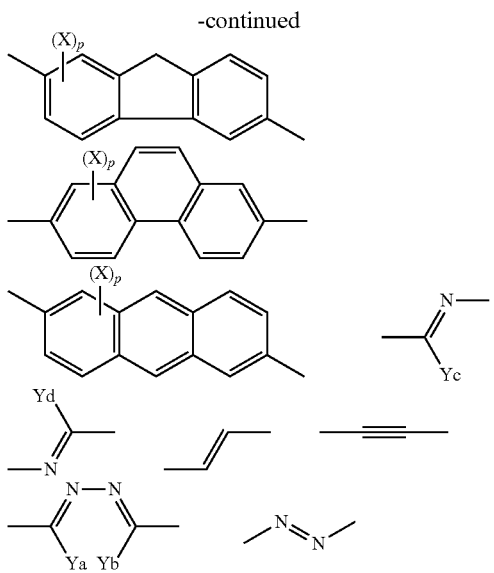

still more preferably represented by any one of the following formulae, and

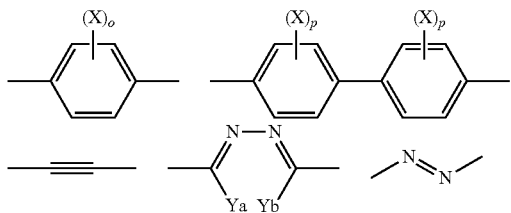

still more preferably represented by the following formula.

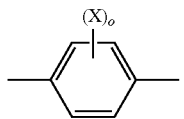

The number of carbon atoms in the alkyl group represented by X in $T^{11}$ is 1 to 8, preferably 1 to 5, and more preferably 1 to 3. The alkylene group may be linear, branched, or cyclic and is preferably linear or branched. Preferable examples of the alkyl group include a methyl group, an ethyl group, an n-propyl group, and an isopropyl group. Among these, a methyl group is preferable. The details of an alkyl portion of the alkoxy group represented by X in $T^{11}$ can be found in the description and preferable range of the alkyl group represented by X in $T^{11}$. Examples of the halogen atom represented by X in $T^{11}$ include a fluorine atom, a chlorine atom, a bromine atom, and an iodine atom. Among these, a chlorine atom or a bromine atom is preferable. Examples of the ester group represented by X in $T^{11}$ include a group represented by R'COO—. R' represents, for example, an alkyl group having 1 to 8 carbon atoms. The description and preferable range of the alkyl group represented by R' can be found in the description and preferable range of the alkyl group represented by X in $T^{11}$. Specific examples of the ester include $CH_3COO$— and $C_2H_5COO$—. The alkyl group having 1 to 4 carbon atoms represented by Ya, Yb, Yc, or Yd may be linear or branched. Examples of the alkyl group having 1 to 4 carbon atoms include a methyl group, an ethyl group, an n-propyl group, and an isopropyl group.

It is preferable that the divalent aromatic heterocyclic group has a 5-membered, 6-membered, or 7-membered heterocycle. A 5-membered or 6-membered heterocycle is more preferable, and a 6-membered heterocycle is most preferable. As a heteroatom constituting the heterocycle, a nitrogen atom, an oxygen atom, or a sulfur atom is preferable. It is preferable that the heterocycle is an aromatic heterocycle. In general, the aromatic heterocycle is an unsaturated heterocycle. An unsaturated heterocycle having most double bonds is more preferable. Examples of the heterocycle include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiin ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. The description and preferable range of the substituent can be found in the description of the substituent with which the monovalent to tetravalent aromatic hydrocarbon represented by $A^1$ or $A^2$ is substituted.

$Hb^{11}$ represents a perfluoroalkyl group having 2 to 30 carbon atoms, more preferably a perfluoroalkyl group having 3 to 20 carbon atoms, and still more preferably a perfluoroalkyl group having 3 to 10 carbon atoms. The perfluoroalkyl group may be linear, branched, or cyclic and is preferably linear or branched and more preferably linear.

m11 and n11 each independently represent 0 to 3 and m11+n11≥1. At this time, a plurality of structures in parentheses may be the same as or different from each other and is preferably the same as each other. m11 and n11 in Formula (I) are determined depending on the valences of $A^{11}$ and $A^{12}$, and preferable ranges thereof are determined depending on the preferable ranges of the valences of $A^{11}$ and $A^{12}$.

o and p in $T^{11}$ each independently represent an integer of 0 or more. In a case where o and p represent an integer of 2 or more, a plurality of X's may be the same as or different from each other. o in $T^{11}$ represents preferably 1 or 2. p in $T^{11}$ represents preferably an integer of 1 to 4 and more preferably 1 to 2.

A molecular structure of the compound represented by Formula (I) may be symmetrical or non-symmetrical. "Symmetry" described herein represents at least one of point symmetry, line symmetry, or rotational symmetry, and "non-symmetry" described herein does not represent any one of point symmetry, line symmetry, and rotational symmetry.

The compound represented by Formula (I) is a combination of the perfluoroalkyl group ($Hb^{11}$), the linking groups -(-$Sp^{11}$-$L^{11}$-$Sp^{12}$-$L^{12}$)$_{m11}$-$A^{11}$-$L^{13}$- and -$L^{14}$-$A^{12}$-($L^{15}$-$Sp^{13}$-$L^{16}$-$Sp^{14}$)$_{n11}$-, and preferably the divalent group having an excluded volume effect which is represented by T. Two perfluoroalkyl groups ($Hb^{11}$) present in the molecule are preferably the same as each other, and the linking groups -(-$Sp^{11}$-$L^{11}$-$Sp^{12}$-$L^{12}$)$_{m11}$-$A^{11}$-$L^{13}$- and -$L^{14}$-$A^{12}$-($L^{15}$-$Sp^{13}$-$L^{16}$-$Sp^{14}$)$_{n11}$- present in the molecule are also preferably the same as each other. $Hb^{11}$-$Sp^{11}$-$L^{11}$-$Sp^{12}$- and -$Sp^{13}$-$L^{16}$-$Sp^{14}$-$Hb^{11}$ present at the terminal are preferably a group represented by any one of the following formulae:

$(C_aF_{2a+1})$—$(C_bH_{2b})$—;

$(C_aF_{2a+1})$—$(C_bH_{2b})$—O—$(C_rH_{2r})$—;

$(C_aF_{2a+1})$—$(C_bH_{2b})$—COO—$(C_rH_{2r})$—; and $(C_aF_{2a+1})$—$(C_bH_{2b})$—OCO—$(C_rH_{2r})$—.

In the above formulae, a represents preferably 2 to 30, more preferably 3 to 20, and still more preferably 3 to 10. b represents preferably 0 to 20, more preferably 0 to 10, and still more preferably 0 to 5. a+b represents 3 to 30. r represents preferably 1 to 10 and more preferably 1 to 4.

In addition, $Hb^{11}$-$Sp^{11}$-$L^{11}$-$Sp^{12}$-$L^{12}$ and -$L^{15}$-$Sp^{13}$-$L^{16}$-$Sp^{14}$-$Hb^{11}$ present at the terminal of Formula (I) are preferably a group represented by any one of the following formulae:

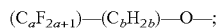
$(C_aF_{2a+1})$—$(C_bH_{2b})$—O—;

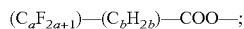
$(C_aF_{2a+1})$—$(C_bH_{2b})$—COO—;

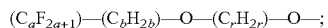
$(C_aF_{2a+1})$—$(C_bH_{2b})$—O—$(C_rH_{2r})$—O—;

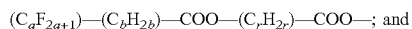
$(C_aF_{2a+1})$—$(C_bH_{2b})$—COO—$(C_rH_{2r})$—COO—; and

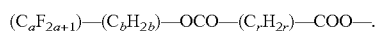
$(C_aF_{2a+1})$—$(C_bH_{2b})$—OCO—$(C_rH_{2r})$—COO—.

In the above formulae, a, b, and r have the same definitions as described above.

The addition amount of the surfactant in the liquid crystal composition is preferably 0.01 mass % to 10 mass %, more preferably 0.01 mass % to 5 mass %, and still more preferably 0.02 mass % to 1 mass % with respect to the total mass of the polymerizable liquid crystal compound.

——Chiral Agent (Optically Active Compound)——

The chiral agent has a function of causing a helical structure of a cholesteric liquid crystal phase to be formed. The chiral compound may be selected depending on the purpose because a helical twisting direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for TN or STN, p. 199), isosorbide, or an isomannide derivative can be used.

In general, the chiral agent includes an asymmetric carbon atom. However, an axially asymmetric compound or a surface asymmetric compound not having an asymmetric carbon atom can be used. Examples of the axially asymmetric compound or the surface asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this configuration, it is preferable that the polymerizable group included in the polymerizable chiral agent is the same as the polymerizable group included in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to an emission wavelength can be formed by photomask exposure of an actinic ray or the like after coating and orientation, which is preferable. As the photoisomerization group, an isomerization portion of a photochromic compound, azo, azoxy, or a cinnamoyl group is preferable. Specific examples of the compound include compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by the following Formula (12).

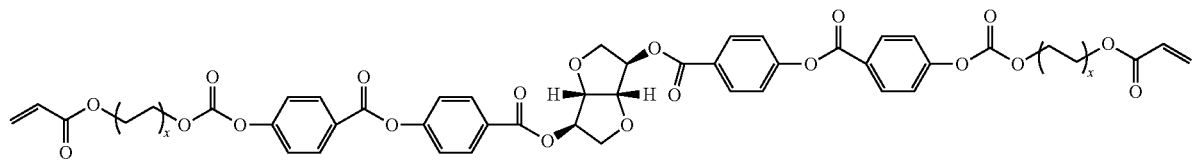

(12)

In the formula, X represents 2 to 5 (integer).

The content of the chiral agent in the liquid crystal composition is preferably 0.01 mol % to 200 mol % and more preferably 1 mol % to 30 mol % with respect to the amount of the polymerizable liquid crystal compound.

——Polymerization Initiator——

In a case where the liquid crystal composition includes a polymerizable compound, it is preferable that the liquid crystal composition includes a polymerization initiator. In a configuration where a polymerization reaction progresses with ultraviolet irradiation, it is preferable that the polymerization initiator is a photopolymerization initiator which initiates a polymerization reaction with ultraviolet irradiation. Examples of the photopolymerization initiator include an α-carbonyl compound (described in U.S. Pat. No. 2,367,661A and U.S. Pat. No. 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. No. 3,046,127A and U.S. Pat. No. 2,951,758A), a combination of a triaryl imidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 mass % to 12 mass % with respect to the content of the polymerizable liquid crystal compound.

——Crosslinking Agent——

In order to improve the film hardness after curing and to improve durability, the liquid crystal composition may arbitrarily include a crosslinking agent. As the crosslinking agent, a curing agent which can perform curing with ultraviolet light, heat, moisture, or the like can be preferably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these curing agents, one kind may be used alone, or two or more kinds may be used in combination.

The content of the crosslinking agent is preferably 3 mass % to 20 mass % and more preferably 5 mass % to 15 mass %. In a case where the content of the crosslinking agent is lower than 3 mass %, an effect of improving the crosslinking density may not be obtained. In a case where the content of the crosslinking agent is higher than 20 mass %, the stability of a cholesteric liquid crystal layer may deteriorate.

——Other Additives——

In a case where an ink jet method described below is used as a method of forming the dot, a monofunctional polymerizable monomer may be used in order to obtain generally required ink properties. Examples of the monofunctional polymerizable monomer include 2-methoxyethyl acrylate, isobutyl acrylate, isooctyl acrylate, isodecyl acrylate, and octyl/decyl acrylate.

In addition, optionally, a polymerization inhibitor, an antioxidant, a ultraviolet absorber, a light stabilizer, a colorant, metal oxide particles or the like can be added to the liquid crystal composition in a range where optical performance and the like do not deteriorate.

It is preferable that the liquid crystal composition is used as a liquid during the formation of the dot.

The liquid crystal composition may include a solvent. The solvent is not particularly limited and can be appropriately selected depending on the purpose. An organic solvent is preferably used.

The organic solvent is not particularly limited and can be appropriately selected depending on the purpose. Examples of the organic solvent include a ketone such as methyl ethyl ketone or methyl isobutyl ketone, an alkyl halide, an amide, a sulfoxide, a heterocyclic compound, a hydrocarbon, an ester, and an ether. Among these curing agents, one kind may be used alone, or two or more kinds may be used in combination. Among these, a ketone is more preferable in consideration of an environmental burden. The above-described component such as the above-described monofunctional polymerizable monomer may function as the solvent.

The liquid crystal composition is applied to the substrate and then is cured to form the dot. The application of the liquid crystal composition to the substrate is preferably performed by jetting. In a case where a plurality of dots are formed on the substrate, the liquid crystal composition may be printed as an ink. A printing method is not particularly limited and, for example, an ink jet method, a gravure printing method, or a flexographic printing method can be used. Among these, an ink jet method is preferable. The pattern of the dots can also be formed using a well-known printing technique.

The liquid crystal composition applied to the substrate is optionally dried or heated and then cured. In a drying or heating step, the polymerizable liquid crystal compound in the liquid crystal composition only has to be oriented. In the case of heating, the heating temperature is preferably 200° C. or lower and more preferably 130° C. or lower.

The oriented liquid crystal compound may be further polymerized. Regarding the polymerization, thermal polymerization or photopolymerization using light irradiation may be performed, and photopolymerization is preferable. Regarding the photopolymerization, ultraviolet light is preferably used. The irradiation energy is preferably 20 mJ/cm$^2$ to 50 mJ/cm$^2$ and more preferably 100 mJ/cm$^2$ to 1500 mJ/cm$^2$. In order to promote a photopolymerization reaction, photopolymerization may be performed under heating conditions or in a nitrogen atmosphere. The wavelength of irradiated ultraviolet light is preferably 250 nm to 430 nm. From the viewpoint of stability, the polymerization degree is preferably high, and is preferably 70% or higher and more preferably 80% or higher.

The polymerization degree can be determined by obtaining a consumption ratio between polymerizable functional groups using an IR absorption spectrum.

[Overcoat Layer] The optical member may include an overcoat layer. The overcoat layer may be provided on a surface of the substrate where the dot is formed, that is, a surface of the substrate in contact with the dot and it is preferable that the surface of the optical member is smoothened.

The overcoat layer is not particularly limited and is preferably a resin layer having a refractive index of about 1.4 to 1.8. In a case where the optical member is used as an input medium such as an input sheet on a display surface of an image display device or the like, in order to prevent scattering of image light from the image display device, a difference in refractive index between the overcoat layer and the dot formed of the liquid crystal material is preferably 0.2 or lower and more preferably 0.1 or lower. The refractive index of the dot formed of the liquid crystal material is about 1.6. By using an overcoat layer having a refractive index close to 1.6 (for example, a refractive index of about 1.4 to 1.8), the polar angle of light which is actually incident on the dot can be reduced. For example, in a case where the overcoat layer having a refractive index of 1.6 is used and light is incident on the optical member at a polar angle of 45°, a polar angle at which light is reliably incident on the dot can be made to be about 27°. Therefore, by using the overcoat layer, the polar angle of light at which the optical member exhibits retroreflection properties can be widened, and high retroreflection properties can be obtained at a wider angle even in the surface of the dot which forms a small angle with the substrate. In addition, the overcoat layer may function as an anti-reflection layer, a pressure sensitive adhesive layer, an adhesive layer, or a hard coat layer.

Examples of the overcoat layer include a resin layer which is obtained by applying a composition including a monomer to the surface of the substrate that is in contact with the dot, and curing the coating film. The resin is not particularly limited and may be selected in consideration of, for example, adhesiveness with the substrate or the liquid crystal material for forming the dot. For example, a thermoplastic resin, a thermosetting resin, or a ultraviolet curable resin can be used. From the viewpoints of durability, solvent resistance, and the like, a resin which is curable by crosslinking is preferable, and an ultraviolet curable resin which is curable within a short period of time is more preferable. Examples of the monomer which can be used for forming the overcoat layer include ethyl (meth)acrylate, ethylhexyl (meth)acrylate, styrene, methylstyrene, N-vinylpyrrolidone, polymethylol propane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth) acrylate.

The thickness of the overcoat layer may be selected depending on the maximum height of the dot without any particular limitation, and is preferably about 5 µm to 100 µm, more preferably 10 µm to 50 µm, and still more preferably 20 µm to 40 µm. The thickness is the distance from a surface of the substrate, where the dot is formed, to a surface of the overcoat layer provided on a surface of the substrate, where the dot is not formed, which is opposite to the surface where the dot is formed.

<Application of Optical Member>

The application of the optical member according to the present invention is not particularly limited and can be used as various reflection members.

For example, the optical member having a configuration in which a plurality of dots are formed to be adjacent to each other on the surface of the substrate can be used as a retroreflection member which reflects only circularly polarized light at a specific wavelength.

In particular, regarding the optical member where the dots are provided in a pattern shape, for example, by forming the pattern as a dot pattern which is encoded to present position information, the optical member can be used as an input medium which is used in combination with input means such as an electronic pen for converting handwritten information into digital data and inputting the digital data into an information processing device. The optical member is used after preparing the liquid crystal material for forming the dot such that the wavelength of light irradiated from the input means is the same as that where the dot exhibits reflecting properties. Specifically, the helical pitch of the cholesteric structure may be adjusted using the above-described method.

The optical member according to the present invention can also be used as an input medium such as an input sheet on a display screen such as a liquid crystal display. At this time, it is preferable that the optical member is transparent. The optical member may be attached to a display screen directly or with another film interposed therebetween so as to be integrated with a display, or may be detachably mounted on a display screen. At this time, it is preferable that the wavelength range of light where the dot in the optical member according to the present invention exhibits selective reflection is different from that of light emitted from a display. That is, it is preferable that the dot has selective reflecting properties in the invisible range and that the display emits invisible light such that a detecting device does not detect light erroneously.

The details of an handwriting input system for converting handwritten information into digital data and inputting the digital data into an information processing device can be found in, for example, JP2014-67398A, JP2014-98943A, JP2008-165385A, paragraphs "0021" to "0032" of JP2008-108236A, or JP2008-077451A.

Examples of a preferable embodiment of the case where the optical member according to the present invention is used as the sheet which is mounted on or in front of a surface of an image-displayable device include an embodiment described in paragraphs "0024" to "0031" of JP4725417B.

Figure 3:
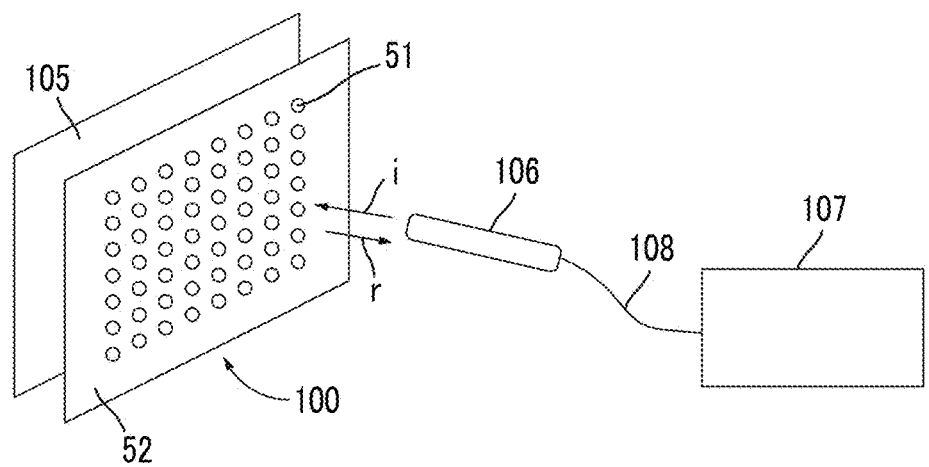
FIG. 3 is a schematic diagram showing a system in which the optical member according to the present invention is used as a sheet which is mounted on or in front of a surface of an image display device (image-displayable device).

FIG. 3 is a schematic diagram showing a system in which the optical member according to the present invention is used as a sheet which is mounted on or in front of a surface of an image-displayable device.

In FIG. 3, a well-known sensor may be used without any particular limitation as long as it emits infrared light i and can detect reflected light r from the above-described pattern. Examples of a pen type input terminal 106 including a read data processing device 107 include an input terminal described in JP2003-256137A including: a pen point that does not include an ink, graphite, or the like; a complementary metal-oxide semiconductor (CMOS) camera that includes an infrared irradiating portion; a processor, a memory; a communication interface such as a wireless transceiver using a Bluetooth (registered trade name) technique; and a battery.

Regarding the operation of the pen type input terminal 106, for example, the pen point is drawn in contact with a front surface of the optical member 100 according to the present invention, the pen type input terminal 106 detects a writing pressure applied to the pen point, and the CMOS camera operates such that a predetermined range around the pen point is irradiated with infrared light at a predetermined wavelength which is emitted from the infrared irradiating portion and such that the pattern is imaged (for example, the pattern is imaged several ten times to several hundred times per second). In a case where the pen type input terminal 106 includes the read data processing device 107, the imaged pattern is analyzed by the processor such that an input trajectory generated by the movement of the pen point during handwriting is converted into numerical values and data to generate input trajectory data, and the input trajectory is transmitted to an information processing device.

Members such as the processor, the memory, the communication interface such as a wireless transceiver using a Bluetooth (registered trade name) technique, or the battery may be provided outside of the pen type input terminal 106 as the read data processing device 107 as shown in FIG. 3. In this case, the pen type input terminal 106 may be connected to the read data processing device 107 through a cord 108, or may transmit read data wirelessly using an electric wave, infrared light, or the like.

In addition, the input terminal 106 may be a reader described in JP2001-243006A.

The read data processing device 107 which can be used in the present invention is not particularly limited as long as it has a function of calculating position information based on continuous image data read from the input terminal 106 and providing the calculated position information together with time information as generate input trajectory data which can be processed in an information processing device. The read data processing device 107 only has to include the members such as the processor, the memory, the communication interface, and the battery.

In addition, the read data processing device 107 may be embedded in the input terminal 106 as described in JP2003-256137A, or may be embedded in an information processing device including a display device. In addition, the read data processing device 107 may transmit the position information to an information processing device including a display device wirelessly, or may be connected thereto through a cord or the like.

In the information processing device connected to a display device 105, an image displayed on the display device 105 is sequentially updated based on trajectory information transmitted from the read data processing device 107 such that a trajectory which is handwritten by the input terminal 106 is displayed on the display device as if it was drawn on paper by a pen.

[Image Display Device]

An image display device according to the present invention includes the optical member according to the present invention.

It is preferable that the optical member according to the present invention is mounted on or in front of an image display surface of the image display device. For example, in the image display device, the optical member according to the present invention may be disposed between an outermost surface or a front surface protective plate of a display device and a display panel. A preferable embodiment of the image display device can be found in the above description regarding the application of the optical member.

The invention described in this specification also includes a system including the image display device in which the optical member according to the present invention is mounted on or in front of an image display surface.

EXAMPLES

Hereinafter, the present invention will be described in detail using examples. Materials, reagents, amounts thereof, proportions thereof, operations, and the like shown in the following examples can be appropriately changed as long as they do not depart from the scope of the present invention. Accordingly, the scope of the present invention is not limited to the following examples.

Example 1

(Preparation of Underlayer)

A composition shown below was stirred and dissolved in a container held at 25° C. to prepare an underlayer-forming solution.

Underlayer-Forming Solution (Part(s) by Mass)
Propylene glycol monomethyl ether acetate: 67.8
Dipentaerythritol hexaacrylate (trade name: KAYARAD DPHA, manufactured by Nippon Kayaku Co., Ltd.): 5.0
MEGAFACE RS-90 (manufactured by DIC Corporation): 26.7
IRGACURE 819 (manufactured by BASF SE): 0.5

The underlayer-forming solution prepared as described above was applied to a transparent polyethylene terephthalate (PET; COSMOSHINE A4100, manufactured by Toyobo Co., Ltd.) substrate having a thickness of 100 μm using an bar coater in an application amount of 3 mL/m$^2$. Next, the underlayer-forming solution was heated such that the film surface temperature was 90° C., and then was dried for 120 seconds. Next, in a nitrogen purged atmosphere having an oxygen concentration of 100 ppm or lower, 700 mJ/cm$^2$ of ultraviolet light was irradiated using an ultraviolet irradiation device to promote a crosslinking reaction. As a result, an underlayer was prepared.

(Formation of Cholesteric Liquid Crystal Dot)

A composition shown below was stirred and dissolved in a container held at 25° C. to prepare a cholesteric liquid crystal ink solution (liquid crystal composition).

Cholesteric Liquid Crystal Ink Solution (Part(s) by Mass)
Methoxyethyl acrylate: 145.0
A mixture of rod-shaped liquid crystal compounds having the following structures: 100.0
IRGACURE 819 (manufactured by BASF SE): 10.0
A chiral agent having the following structure: 3.8
A surfactant having the following structure: 0.08

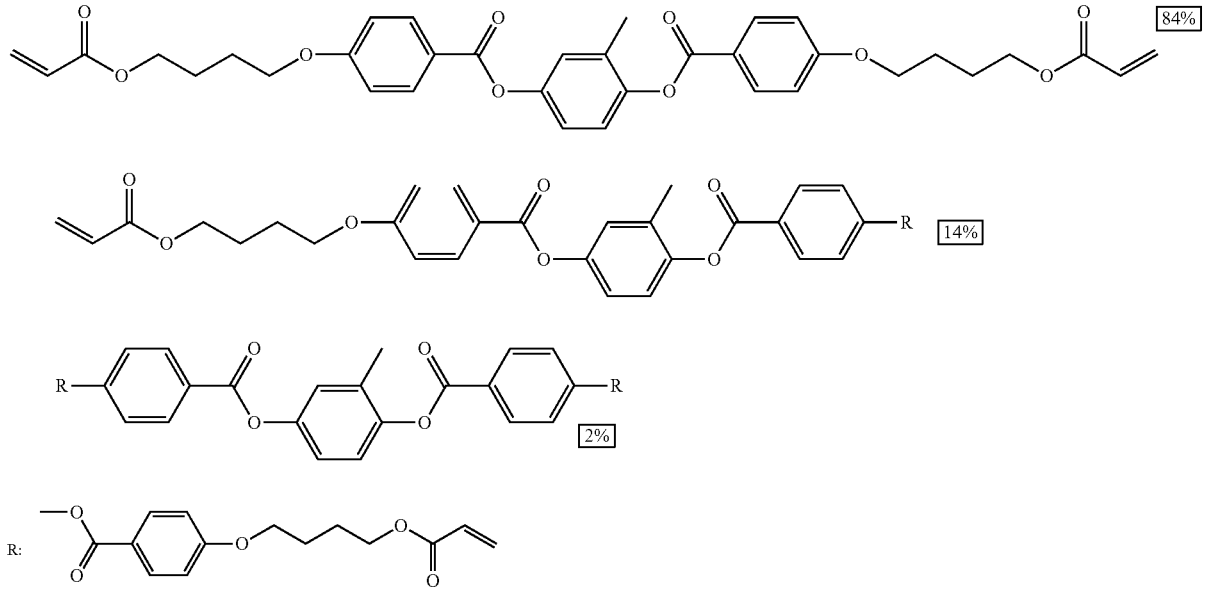

Rod-Shaped Liquid Crystal Compounds

Numerical values are represented by mass %. In addition, a group represented by R is a partial structure present on the left and right sides, and this partial structure is bonded to an oxygen atom portion.

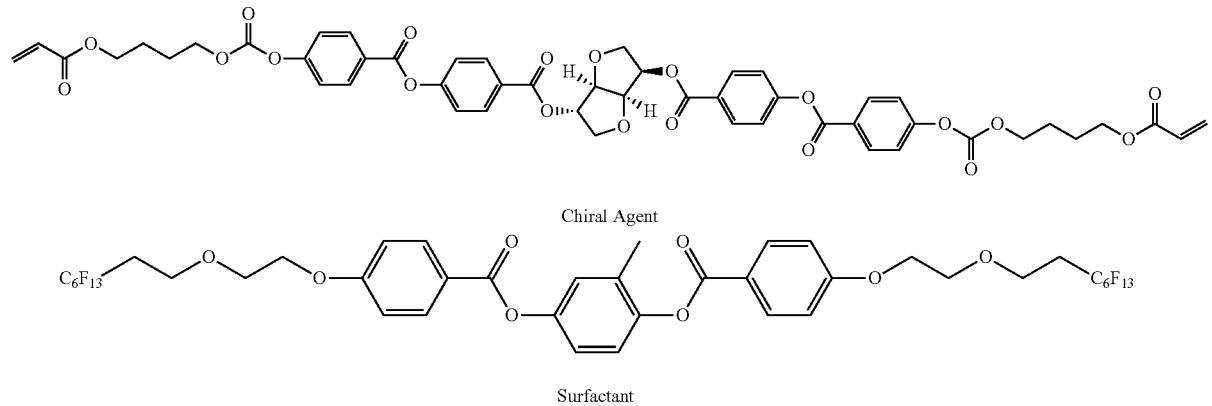

Chiral Agent

Surfactant

The cholesteric liquid crystal ink solution prepared as described above was applied to the entire 50×50 mm region of the underlayer of the PET prepared as described above using an ink jet printer (DMP-2831, manufactured by Fujifilm Dimatix Inc.) such that the distance between dot centers was 300 µm and the dot diameter was 50 µm. Next, the cholesteric liquid crystal ink solution was dried at 95° C. for 30 seconds and was irradiated with 500 mJ/cm$^2$ of ultraviolet light using an ultraviolet irradiation device. As a result, an optical member was obtained.

(Dot Shape and Evaluation of Cholesteric Structure)

Among the dots of the optical member obtained as described above, 10 dots were selected arbitrarily, and the shapes of the dots were observed using a laser microscope (manufactured by Keyence Corporation). The average diameter of the dots was 50 µm, the average maximum height was 8 µm, an average angle at a contact portion between a dot surface of a dot end portion and a underlayer surface was 36 degrees, and the height was continuously increased in a direction from the dot end portion to the center.

Figure 2:
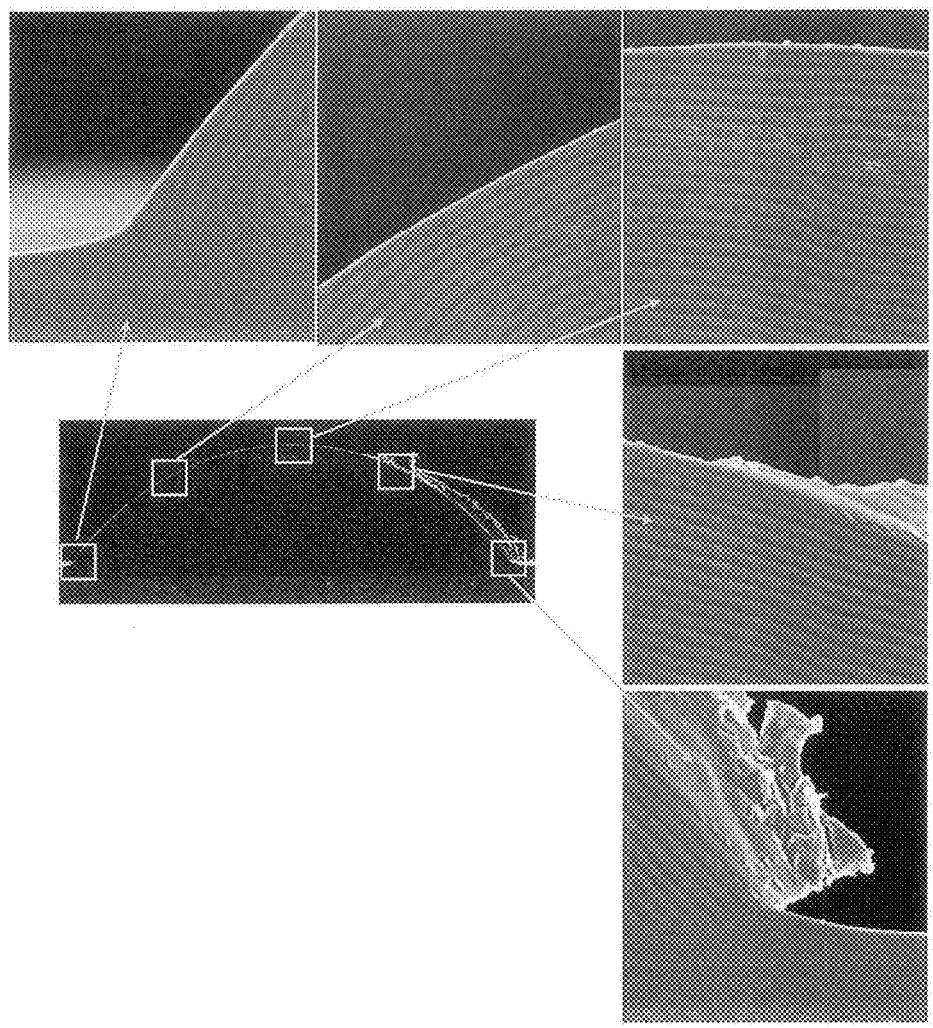
FIG. 2 is a diagram showing images of a cross-section of a dot of an optical member prepared in Example when observed with a scanning electron microscope (SEM).

Regarding one dot positioned at the center of the obtained optical member, a surface including the dot center was cut in a direction perpendicular to the PET substrate, and the obtained cross-section was observed using the above-described scanning electron microscope. As a result, a stripe pattern including bright portions and dark portions was observed in the dot, and a cross-sectional view shown in FIG. 2 was obtained (FIG. 2 is a cross-sectional view showing the optical member according to Example 3 described below, and a portion present outside of a hemispherical shape on the right side of the cross-sectional view is a burr generated during cutting).

In the cross-sectional view, an angle between a normal direction perpendicular to a line, which was formed using a first dark portion from an air interface-side surface of the dot, and the air interface-side surface was measured. The angles measured at a dot end portion, at a portion between the dot end portion and the dot center, at the dot center were 90 degrees, 89 degrees, and 90 degrees, respectively. Further, regarding an angle between the normal direction of the line formed using the dark portion and a normal direction perpendicular to the PET substrate, the values measured at a dot end portion, at a portion between the dot end portion and the dot center, at the dot center were 35 degrees, 18 degrees, and 0 degrees, respectively, which were continuously decreased.

(Formation of Overcoat Layer)

A composition shown below was stirred and dissolved in a container held at 25° C. to prepare an overcoat layer-forming coating solution.

Overcoat Layer-Forming Coating Solution (Part(s) by Mass)
Acetone: 100.0
KAYARAD DPCA-30 (manufactured by Nippon Kayaku Co., Ltd.): 100.0
IRGACURE 819 (manufactured by BASF SE): 3.0

The overcoat layer-forming coating solution prepared as described above was applied to the underlayer, where the cholesteric liquid crystal dot was formed, using a bar coater in an application amount of 40 mL/m$^2$. Next, the overcoat layer-forming coating solution was heated such that the film surface temperature was 50° C., and then was dried for 60 seconds. Next, 500 mJ/cm$^2$ of ultraviolet light was irradiated using an ultraviolet irradiation device to promote a cross-linking reaction. As a result, an overcoat layer was prepared.

(Evaluation of Dot Performance)

The transmittance and haze of the optical member with the overcoat layer prepared as described above were measured using a haze meter (manufactured by Nippon Denshoku Industries Co., Ltd.). The transmittance was 89.0%, and the haze was 0.4%.

In addition, using an visible and near-infrared light source (HL-2000, manufactured by Ocean Optics Inc.), a ultra high-resolution multi-channel fiber spectrophotometer (HR4000), and a 2-branched optical fiber, the wavelength selective reflecting properties of the optical member were measured in 5 arbitrary visual fields having a diameter of 2 mm. In all the visual fields, the reflection peak wavelengths were 850 nm, and all the dots constantly exhibited retroreflection properties in a polar angle range of 0 to 50 degrees in a case where the normal line perpendicular to the optical member was set as 0 degrees.

Examples 2 to 16

Optical members with the overcoat layer were prepared using the same preparation method as in Example 1, except that the amount of DPHA in the underlayer-forming solution, the amount of the chiral agent in the cholesteric liquid crystal ink solution, the dot diameter during ink jet printing, and whether or not the overcoat layer was provided were changed as shown in the following table.

TABLE 1

| | Amount of DPHA in Underlayer | Surfactant | Amount of Chiral Agent in Cholesteric Liquid Crystal Ink Solution | Dot Diameter During Ink Jet Printing | Overcoat Layer |
|---|---|---|---|---|---|
| Example 1 | 5 | Included | 3.8 | 50 | Formed |
| Example 2 | 15 | Included | 3.8 | 50 | Formed |
| Example 3 | 0 | Included | 3.8 | 50 | Formed |
| Example 4 | 15 | Included | 3.8 | 30 | Formed |
| Example 5 | 0 | Included | 3.8 | 30 | Formed |
| Example 6 | 15 | Included | 3.8 | 80 | Formed |
| Example 7 | 5 | Included | 3.8 | 80 | Formed |
| Example 8 | 0 | Included | 3.8 | 80 | Formed |
| Example 9 | 15 | Included | 3.8 | 120 | Formed |
| Example 10 | 0 | Included | 3.8 | 120 | Formed |
| Example 11 | 5 | Included | 3.8 | 80 | Not Formed |
| Example 12 | 0 | Included | 3.8 | 50 | Not Formed |
| Example 13 | 0 | Included | 3.8 | 30 | Not Formed |
| Example 14 | 5 | Included | 3.5 | 50 | Formed |
| Example 15 | 15 | Included | 4.1 | 50 | Formed |
| Example 16 | 0 | Included | 3.2 | 50 | Formed |

Table 3 shows the results of measuring or calculating the dot diameter, maximum height/diameter, and the respective angles using the same method as in Example 1.

Example 17

An optical member with the overcoat layer was prepared using the same preparation method as in Example 1, except that: the addition amount of the chiral agent was changed to 5.8 parts by mass; and the distance between dot centers during ink jet printing was changed to 53 μm. In addition, using an visible and near-infrared light source (HL-2000, manufactured by Ocean Optics Inc.), a ultra high-resolution multi-channel fiber spectrophotometer (HR4000), and a 2-branched optical fiber, the wavelength selective reflecting properties of the optical member with the overcoat layer were measured in 5 arbitrary visual fields having a diameter of 2 mm. In all the visual fields, the reflection peak wavelengths were 550 nm, and all the dots constantly exhibited retroreflection properties in a polar angle range of 0 to 70 degrees and in an azimuthal angle range of 0 to 360 degrees in a case where the normal line perpendicular to the optical member was set as 0 degrees.

Example 18

(Preparation of Glass Substrate)

A glass substrate having a size of 10 cm×10 cm (trade name: Eagle XG, manufactured by Corning Inc.) was washed with pure water for 30 minutes while applying ultrasonic waves. Next, under the following plasma treatment conditions, a plasma treatment was performed in oxygen, and then a plasma treatment was performed in fluorine gas. As a result, a glass substrate for cholesteric liquid crystal ink jet printing was obtained.

<Plasma Treatment Conditions>

Device: a direct type atmospheric pressure plasma surface treatment device (manufactured by Air Water Inc)

1) Gas: $O_2$, pressure=25 Pa, RF power=100 W, treatment time=2 minutes

2) Gas: $CF_4$, pressure=80 Pa, RF power=300 W, treatment time=10 minutes

The cholesteric liquid crystal ink used in Example 10 was applied to the glass substrate having a size of 10 cm×10 cm, which was prepared using the above-described method, using an ink jet printer (DMP-2831, manufactured by Fujifilm Dimatix Inc.) under the same conditions (for example, the distance between dot centers) as in Example 10. Next, under the same conditions as in Example 10, the cholesteric liquid crystal ink was dried and was irradiated with ultraviolet light. As a result, an optical member having the same dot diameter as in Example 10 was obtained.

Further, the overcoat layer was formed under the same conditions as in Example 10, and the performance of the dot was evaluated. As a result, high retroreflection was exhibited in a polar angle range of 0 to 50 degrees as in the case of Example 10.

Comparative Example 1

(Preparation of Underlayer)

A composition shown below was stirred and dissolved in a container held at 25° C. to prepare an underlayer-forming solution.

Underlayer-Forming Solution (Part(s) by Mass)

Methyl ethyl ketone: 220

Pentaerythritol triacrylate: 100

Leveling agent (BYK 361, manufactured by BYK-Chemie Japan K.K.): 0.03

LUCIRIN TPO, (manufactured by BASF SE): 4

Th underlayer-forming solution prepared as described above was applied to a transparent polyethylene terephthalate (PET; COSMOSHINE A4100, manufactured by Toyobo Co., Ltd.) substrate having a thickness of 100 μm using an bar coater in an application amount of 3 mL/m². Next, the underlayer-forming solution was heated such that the film surface temperature was 80° C., and then was dried for 120 seconds. As a result, an underlayer was formed.

(Formation of Cholesteric Liquid Crystal Dot)

A composition shown below was stirred and dissolved in a container held at 25° C. to prepare a cholesteric liquid crystal ink solution.

Cholesteric Liquid Crystal Ink Solution (Part(s) by Mass)

Methyl isobutyl ketone: 250.0

A rod-shaped liquid crystal compound having the following structures: 100.0

LUCIRIN TPO, (manufactured by BASF SE): 4.0

A chiral agent having the following structure: 3.3

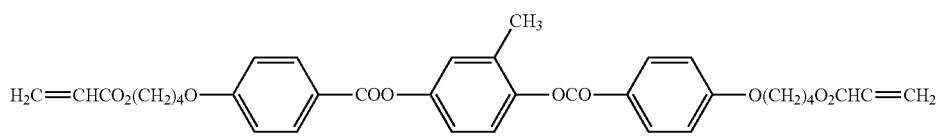

Rod-Shaped liquid Crystal Compound

-continued

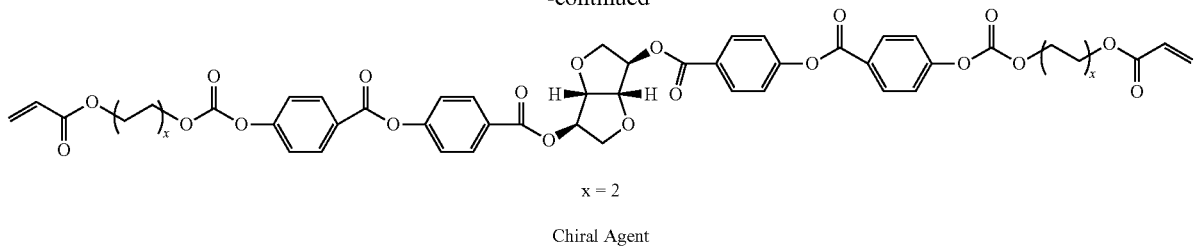

x = 2

Chiral Agent

The cholesteric liquid crystal ink solution prepared as described above was applied to the entire 50×50 mm region of the underlayer of the PET prepared as described above using a gravure printing method such that the distance between dot centers was 300 µm and the dot diameter was 100 µm. Next, the cholesteric liquid crystal ink solution was heated and dried and was irradiated with ultraviolet light to be crosslinked. As a result, an optical member was obtained.

Comparative Examples 2 to 4

Optical members with the overcoat layer according to Comparative Examples 2 to 4 were prepared using the same method as in Example 1, except that: the amount of DPHA in the underlayer-forming solution was changed as shown in Table 2; and a surfactant was used in the cholesteric liquid crystal ink solution. Here, in Comparative Example 3, 0.1 parts by mass of the leveling agent used in the underlayer according to Comparative Example 1 was further added to the underlayer-forming solution.

TABLE 2

|  | Amount of DPHA in Under-layer | Surfactant | Amount of Chiral Agent in Cholesteric Liquid Crystal Ink Solution | Dot Diameter During Ink Jet Printing | Over-coat Layer |
|---|---|---|---|---|---|
| Comparative Example 2 | 5 | Not Included | 3.8 | 50 | Formed |
| Comparative Example 3 | 0 | Not Included | 3.8 | 50 | Formed |
| Comparative Example 4 | 25 | Not Included | 3.8 | 50 | Formed |

Regarding Comparative Examples 1 to 4, Table 3 shows the results of measuring or calculating the dot diameter, maximum height/diameter, and the respective angles using the same method as in Example 1.

TABLE 3

|  | Angle Between Normal Line Perpendicular to Dark Portion and Surface | | | Angle Between Normal Line Perpendicular to Dark Portion and Normal Line Perpendicular to Substrate | | | | |
|---|---|---|---|---|---|---|---|---|
|  | End Portion | Between End Portion and Center | Center | End Portion | Between End Portion and Center | Center | Diameter | Maximum Height/Diameter |
| Example 1 | 90 | 89 | 90 | 35 | 18 | 0 | 50 | 0.16 |
| Example 2 | 84 | 89 | 86 | 23 | 14 | 4 | 50 | 0.13 |
| Example 3 | 80 | 84 | 88 | 52 | 27 | 2 | 50 | 0.30 |
| Example 4 | 76 | 84 | 88 | 16 | 9 | 2 | 30 | 0.13 |
| Example 5 | 84 | 86 | 88 | 53 | 28 | 2 | 30 | 0.28 |
| Example 6 | 86 | 87 | 88 | 27 | 14 | 2 | 80 | 0.14 |
| Example 7 | 88 | 89 | 90 | 44 | 22 | 0 | 80 | 0.21 |
| Example 8 | 74 | 82 | 90 | 44 | 22 | 0 | 80 | 0.29 |
| Example 9 | 90 | 89 | 88 | 30 | 16 | 2 | 120 | 0.13 |
| Example 10 | 76 | 83 | 90 | 36 | 18 | 0 | 120 | 0.23 |
| Example 11 | 88 | 89 | 90 | 44 | 22 | 0 | 80 | 0.21 |
| Example 12 | 80 | 84 | 88 | 52 | 27 | 2 | 50 | 0.30 |
| Example 13 | 84 | 86 | 88 | 53 | 28 | 2 | 30 | 0.28 |
| Example 14 | 90 | 90 | 90 | 35 | 18 | 0 | 50 | 0.16 |
| Example 15 | 84 | 89 | 86 | 23 | 14 | 4 | 50 | 0.13 |
| Example 16 | 80 | 84 | 88 | 52 | 27 | 2 | 50 | 0.30 |
| Comparative Example 1 | 65 | 78 | 75 | 0 | 25 | 15 | 100 | 0.11 |
| Comparative Example 2 | 55 | 73 | 90 | 0 | 0 | 0 | 50 | 0.16 |
| Comparative Example 3 | 30 | 60 | 90 | 17 | 9 | 0 | 50 | 0.40 |
| Comparative Example 4 | 65 | 78 | 90 | 2 | 1 | 0 | 50 | 0.10 |

TABLE 3-continued

|  | Angle between Dot Surface of Dot End Portion and Underlayer | Transmittance | Haze | Reflection Peak Wavelength | Retroreflection Range (0 Degrees~) |
|---|---|---|---|---|---|
| Example 1 | 35.5 | 89 | 0.4 | 850 | 50 |
| Example 2 | 29.1 | 89 | 0.4 | 850 | 45 |
| Example 3 | 61.9 | 89 | 0.4 | 850 | 50 or Higher |
| Example 4 | 29.9 | 89 | 0.3 | 850 | 45 |
| Example 5 | 59.1 | 89 | 0.3 | 850 | 50 or Higher |
| Example 6 | 30.8 | 89 | 0.4 | 850 | 45 |
| Example 7 | 46.1 | 89 | 0.4 | 850 | 50 or Higher |
| Example 8 | 59.8 | 89 | 0.4 | 850 | 50 or Higher |
| Example 9 | 29.9 | 88 | 0.6 | 850 | 45 |
| Example 10 | 50.0 | 88 | 0.6 | 850 | 50 or Higher |
| Example 11 | 46.1 | 89 | 8 | 850 | 45 |
| Example 12 | 61.9 | 89 | 5 | 850 | 50 or Higher |
| Example 13 | 59.1 | 89 | 3.5 | 850 | 50 or Higher |
| Example 14 | 35.5 | 89 | 0.4 | 900 | 45 |
| Example 15 | 29.1 | 89 | 0.4 | 800 | 50 |
| Example 16 | 61.9 | 89 | 0.4 | 90 | 50 |
| Comparative Example 1 | 24.8 | 88 | 20 | 850 | 25 |
| Comparative Example 2 | 35.5 | 89 | 0.4 | 850 | 10 |
| Comparative Example 3 | 77.3 | 89 | 0.4 | 850 | Insufficient Light Intensity |
| Comparative Example 4 | 22.6 | 89 | 0.4 | 850 | 20 |

EXPLANATION OF REFERENCES

1: dot
2: substrate
3: support
4: underlayer
5: overcoat layer
100: optical member
105: display device
106: pen type input terminal
107: read data processing device
108: cord

What is claimed is:

1. An optical member comprising:
a substrate; and
a dot that is in contact with a surface of the substrate,
wherein the dot has wavelength selective reflecting properties,
the dot is formed of a liquid crystal material having a cholesteric structure,
the cholesteric structure has a stripe pattern including bright portions and dark portions in a cross-sectional view of the dot when observed with a scanning electron microscope,
the dot includes a portion having a height which continuously increases to a maximum height in a direction moving from an end portion of the dot to the center of the dot,
regarding all the points of an inclined portion or a curved portion from said end portion of the dot, an angle between a normal line perpendicular to a line, which is formed using a first dark portion from a surface of the dot, and the surface of the dot is in a range of 70° to 90°, and
the liquid crystal material includes a surfactant.

2. The optical member according to claim 1,
wherein a plurality of the dots are provided in a pattern shape on the surface of the substrate.

3. The optical member according to claim 1,
wherein a diameter of the dot is 20 to 200 μm.

4. The optical member according to claim 1,
wherein a diameter of the dot is 30 to 120 μm.

5. The optical member according to claim 1,
wherein a value obtained by dividing the maximum height by the diameter of the dot is 0.13 to 0.30.

6. The optical member according to claim 1,
wherein in the end portion of the dot, an angle between the surface of the dot and the substrate is 27° to 62°.

7. The optical member according to claim 1,
wherein the surfactant is a fluorine surfactant.

8. The optical member according to claim 1,
wherein the liquid crystal material is a material obtained by curing a liquid crystal composition including a liquid crystal compound, a chiral agent, and the surfactant.

9. The optical member according to claim 1,
wherein the dot has wavelength selective reflecting properties in which a center wavelength is present in an infrared range.

10. The optical member according to claim 9,
wherein the dot has wavelength selective reflecting properties in which a center wavelength is present at a wavelength of 800 to 950 nm.

11. The optical member according to claim 1 which is transparent in a visible range.

12. An image display device comprising the optical member according to claim 11.

13. The optical member according to claim 7,
wherein the surfactant comprises a compound represented by the following Formula (I):

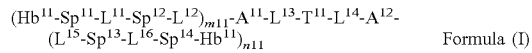

wherein $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (in Formula (I), R represents a hydrogen atom or an alkyl group having 1 to 6 carbon atoms), $Sp^{11}$, $Sp^{12}$, $Sp^{13}$, and $Sp^{14}$ each independently represent a single bond or an alkylene group having 1 to 10 carbon atoms, $A^{11}$ and $A^{12}$ represent a monovalent to tetravalent aromatic hydrocarbon group, $T^{11}$ represents a divalent group or a divalent aromatic heterocyclic group represented by any one of the following formulae (X in $T^{11}$ represents an alkyl group having 1 to 8 carbon atoms, an alkoxy group, a halogen atom, a cyano group, or an ester group, Ya, Yb, Yc, and Yd each independently represent a hydrogen atom or an alkyl group having 1 to 4 carbon atoms, and o and p each independently represent an integer of 0 to 4),

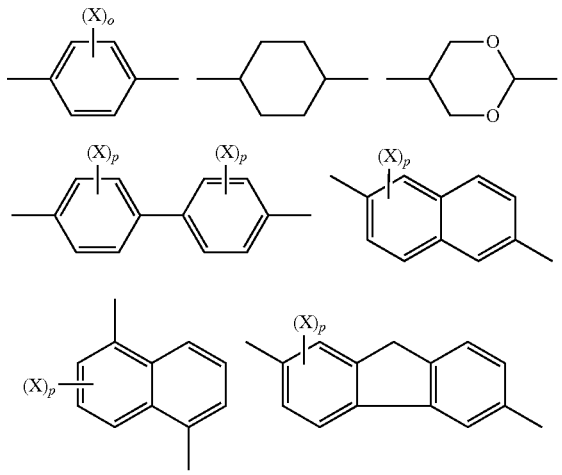

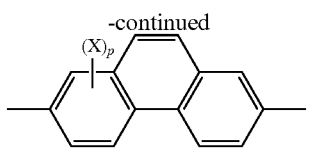

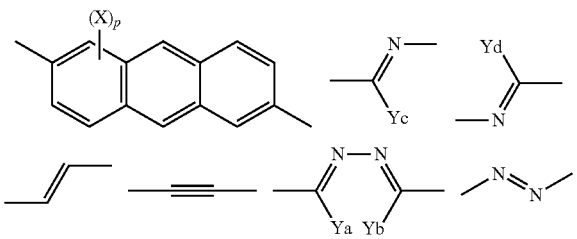

$Hb^{11}$ represents a perfluoroalkyl group having 2 to 30 carbon atoms, m11 and n11 each independently represent 0 to 3 and m11+n11≥1.

14. The optical member according to claim 7,
wherein $Hb^{11}$-$Sp^{11}$-$L^{11}$-$Sp^{12}$-$L^{12}$ and -$L^{15}$-$Sp^{13}$-$L^{16}$-$Sp^{14}$-$Hb^{11}$ present at the terminal of Formula (I) are a group represented by any one of the following formulae:

$(C_aF_{2a+1})$—$(C_bH_{2b})$—O—;

$(C_aF_{2a+1})$—$(C_bH_{2b})$—COO—;

$(C_aF_{2a+1})$—$(C_bH_{2b})$—O—$(C_rH_{2r})$—O—;

$(C_aF_{2a+1})$—$(C_bH_{2b})$—COO—$(C_rH_{2r})$—COO—; and $(C_aF_{2a+1})$—$(C_bH_{2b})$—OCO—$(C_rH_{2r})$—COO—, wherein a represents an integer of 2 to 30, b represents an integer of 0 to 20, a+b represents 3 to 30, and r represents an integer of 1 to 10.

15. The optical member according to claim 7,
wherein the surfactant comprises the following compound

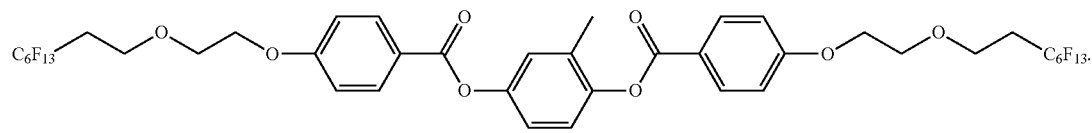

16. The optical member according to claim 8,
wherein the addition amount of the surfactant in the liquid crystal composition is 0.01 mass % to 10 mass %.

17. The optical member according to claim 15,
wherein the liquid crystal material is a material obtained by curing a liquid crystal composition including a liquid crystal compound, a chiral agent, and the surfactant.

18. The optical member according to claim 17,
wherein the addition amount of the surfactant in the liquid crystal composition is 0.01 mass % to 10 mass %.

19. The optical member according to claim 8,
wherein the liquid crystal compound is a combination of the following compounds:

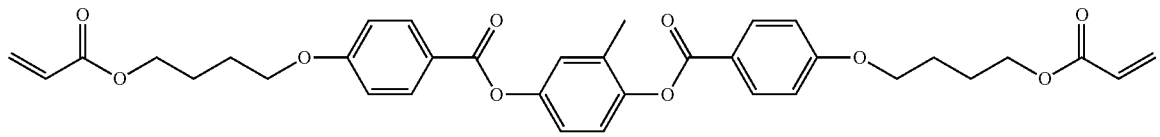

-continued
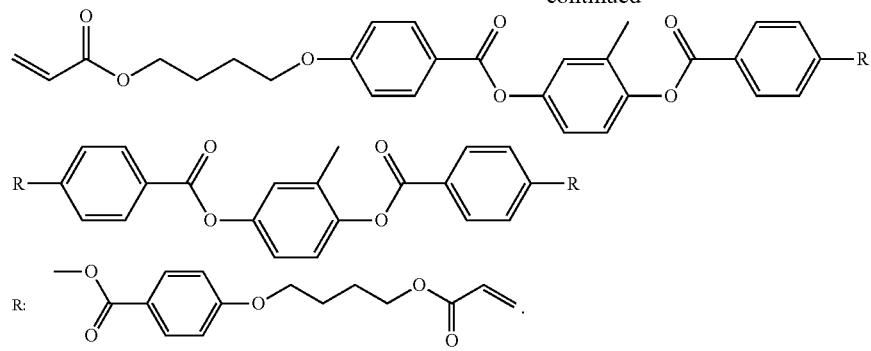
20. The optical member according to claim 19, wherein the surfactant comprises the following compound:
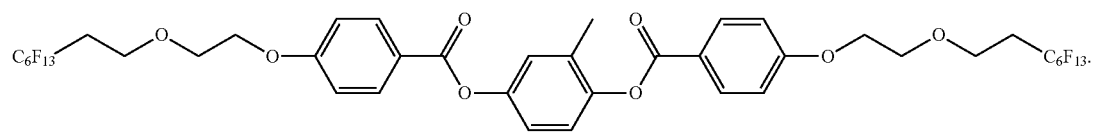
* * * * *